(12) United States Patent
Lokken

(10) Patent No.: US 9,695,917 B2
(45) Date of Patent: Jul. 4, 2017

(54) CABLE ACTUATORS AND CABLE ACTUATED APPARATUSES AND SYSTEMS

(71) Applicant: Altimate Medical Inc., Morton, MN (US)

(72) Inventor: Michael Warren Lokken, Grove City, MN (US)

(73) Assignee: Texas Capital Bank National Association, Dallas, TX (US)

( * ) Notice: Subject to any disclaimer, the term of this patent is extended or adjusted under 35 U.S.C. 154(b) by 134 days.

(21) Appl. No.: 14/372,230

(22) PCT Filed: Jan. 18, 2013

(86) PCT No.: PCT/US2013/022166
§ 371 (c)(1),
(2) Date: Jul. 15, 2014

(87) PCT Pub. No.: WO2013/109905
PCT Pub. Date: Jul. 25, 2013

(65) Prior Publication Data
US 2014/0339858 A1 Nov. 20, 2014

Related U.S. Application Data

(60) Provisional application No. 61/588,929, filed on Jan. 20, 2012.

(51) Int. Cl.
*F16H 21/44* (2006.01)
*A61G 5/14* (2006.01)
*A61H 3/04* (2006.01)

(52) U.S. Cl.
CPC .............. *F16H 21/44* (2013.01); *A61G 5/14* (2013.01); *A61H 3/04* (2013.01);
(Continued)

(58) Field of Classification Search
CPC ...... A61G 5/14; A61H 3/04; A61H 2003/043; A61H 2003/046; B60N 2/0296;
(Continued)

(56) References Cited

U.S. PATENT DOCUMENTS 2,957,352 A * 10/1960 Pierce .................. B63H 21/213
477/113
4,201,095 A * 5/1980 Cirami ................. B62M 25/045
474/81

(Continued)

OTHER PUBLICATIONS

Written Opinion and Search Report from Application No. PCT/US2013/022166 dated May 9, 2013 (11 pages).
(Continued)

*Primary Examiner* — Daniel D Yabut
(74) *Attorney, Agent, or Firm* — Calfee, Halter & Griswold LLP

(57) ABSTRACT

A cable actuator includes a housing and a cam disposed in the housing. The cam includes a first cable retaining portion and a second cable retaining portion. The cam is movable between a first position in which the first cable retaining portion is in an actuated position and the second cable retaining portion is in a return position, and a second position in which the first cable retaining portion is in a return position and the second cable retaining portion is in an actuated position.

23 Claims, 14 Drawing Sheets

(52) U.S. Cl.
CPC .... *A61G 2200/327* (2013.01); *A61G 2200/34* (2013.01); *A61G 2200/36* (2013.01); *A61H 2201/0161* (2013.01); *Y10T 74/1896* (2015.01)

(58) Field of Classification Search
CPC ............ G05G 7/04; G05G 2009/04718; Y10T 74/20438; Y10T 74/20396; Y10T 74/20486; Y10T 74/2048; Y10T 74/20498; Y10T 74/2042; Y10T 74/20402; Y10T 74/20287; Y10T 74/2028; Y10T 74/2069; Y10T 74/20702
See application file for complete search history.

(56) References Cited

U.S. PATENT DOCUMENTS

| | | | |
|---|---|---|---|
| 4,431,076 A | 2/1984 | Simpson | |
| 4,512,451 A * | 4/1985 | Kobelt | B63H 21/213 477/112 |
| 4,771,856 A * | 9/1988 | Hutchison | F16H 37/021 180/333 |
| 6,199,951 B1 | 3/2001 | Zeile et al. | |
| 6,212,969 B1 * | 4/2001 | Kuo | A61H 3/04 188/19 |
| 6,474,739 B1 | 11/2002 | Lagerweij | |
| 2007/0046091 A1 * | 3/2007 | Day | B60N 2/0296 297/378.12 |
| 2007/0062324 A1 * | 3/2007 | Ingraham | B60N 2/3011 74/506 |
| 2007/0296257 A1 * | 12/2007 | Nathan | B60N 2/206 297/325 |
| 2008/0224520 A1 | 9/2008 | Veluswamy et al. | |

OTHER PUBLICATIONS

International Preliminary Report on Patentability from Application No. PCT/US2013/022166 dated May 5, 2015 (8 pages).

* cited by examiner

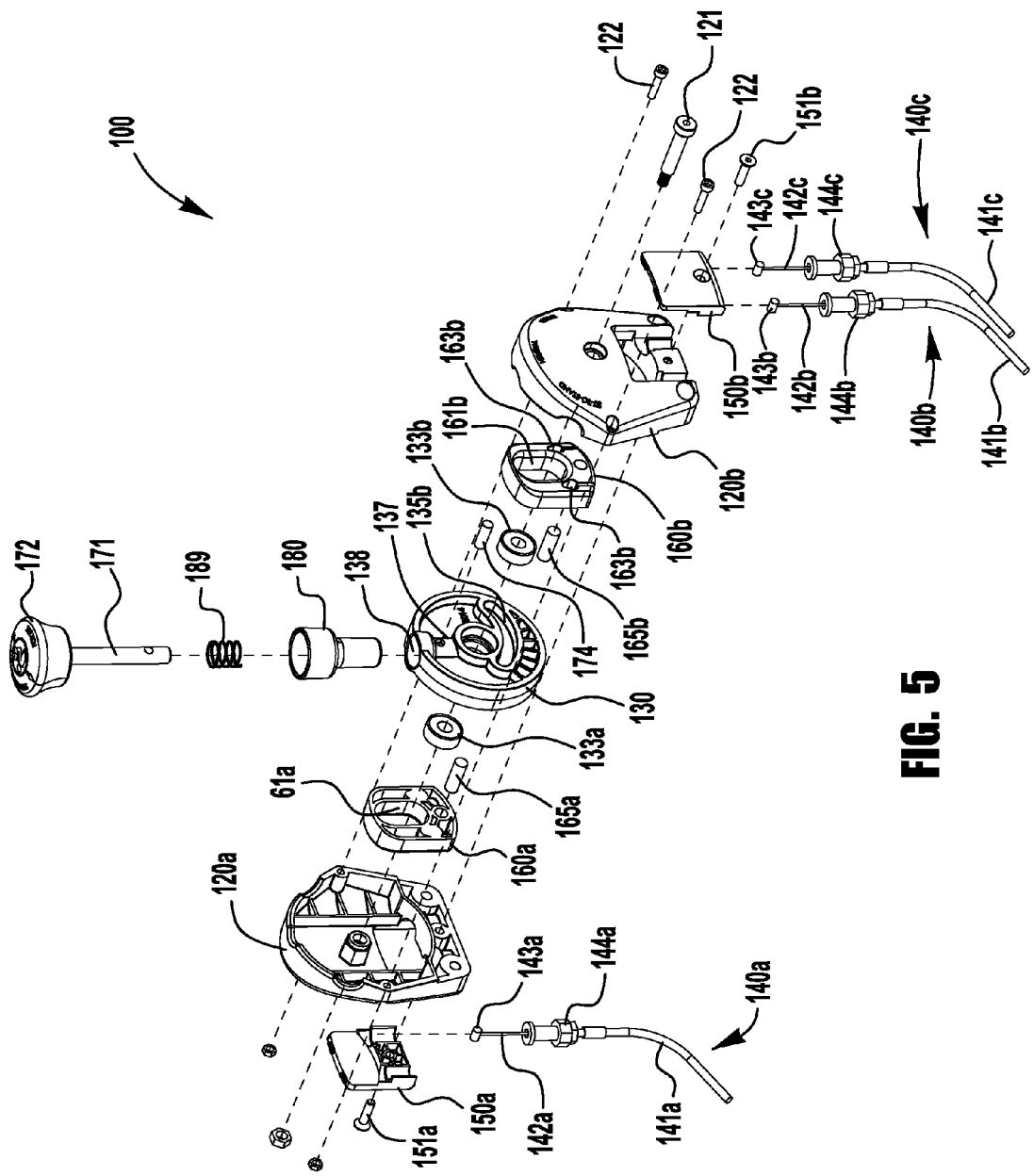

CABLE ACTUATORS AND CABLE ACTUATED APPARATUSES AND SYSTEMS

CROSS REFERENCE TO RELATED APPLICATIONS

The present application is a national phase entry under 35 U.S.C. §371 of, and claims priority to, International Application No. PCT/US2013/022166 filed on Jan. 18, 2013, for CABLE ACTUATOR AND CABLE ACTUATED APPARATUSES AND SYSTEMS, which claims priority to U.S. Provisional Patent Application Ser. No. 61/588,929 filed on Jan. 20, 2012, the entire disclosures of which are fully incorporated herein by reference.

BACKGROUND

Many assemblies such as, for example, mobility aides, include components that move or articulate through a range of motion. In many cases, these components may be moved into multiple positions such as a sitting position or a standing position. One example of such an assembly is a standing frame of the type manufactured by Altimate Medical, Inc. of Morton, Minn., US. Other examples of mobility aides include, for example, wheelchairs, seating systems, walkers and rollators. It is not unusual for such assemblies to have latching or locking mechanisms that are manually or electro-mechanically actuated.

SUMMARY

The present application discloses exemplary embodiments of a cable actuator for use with a variety of apparatuses, including, for example, a wheelchair or standing frame. In one exemplary embodiment, a cable actuator is configured for selective operation of one or more of a plurality of cable actuated devices by operation of a single manual controller.

Accordingly, in an exemplary embodiment, a cable actuator includes a housing and a cam disposed in the housing. The cam includes a first cable retaining portion and a second cable retaining portion. The cam is movable between a first position in which the first cable retaining portion is in an actuated position and the second cable retaining portion is in a return position, and a second position in which the first cable retaining portion is in a return position and the second cable retaining portion is in an actuated position.

In another exemplary embodiment, an apparatus includes a first device operable between an actuated condition and a return condition, a second device operable between an actuated condition and a return condition, and a cable actuator. The cable actuator includes a housing, first and second cables, and a cam. The first cable has a first end positioned within the housing and a second end connected with the first device. The second cable has a first end positioned within the housing and a second end connected with the second device. The cam is disposed in the housing and is operably connected with the first and second cables. The cam is movable to a first position to apply a first force to the first cable to move the first device to the actuated condition, and to a second position to apply a second force to the second cable to move the second device to the actuated condition, with the first cable being free of the first force when the cam is in the second position to maintain the first device in the return condition.

BRIEF DESCRIPTION OF THE DRAWINGS

Further features and advantages will become apparent to those of ordinary skill in the art to which the invention pertains from a reading of the following description together with the accompanying drawings, in which:

FIG. 5 is an exploded perspective view of the cable actuator of FIG. 4;

DESCRIPTION

Figure 1:
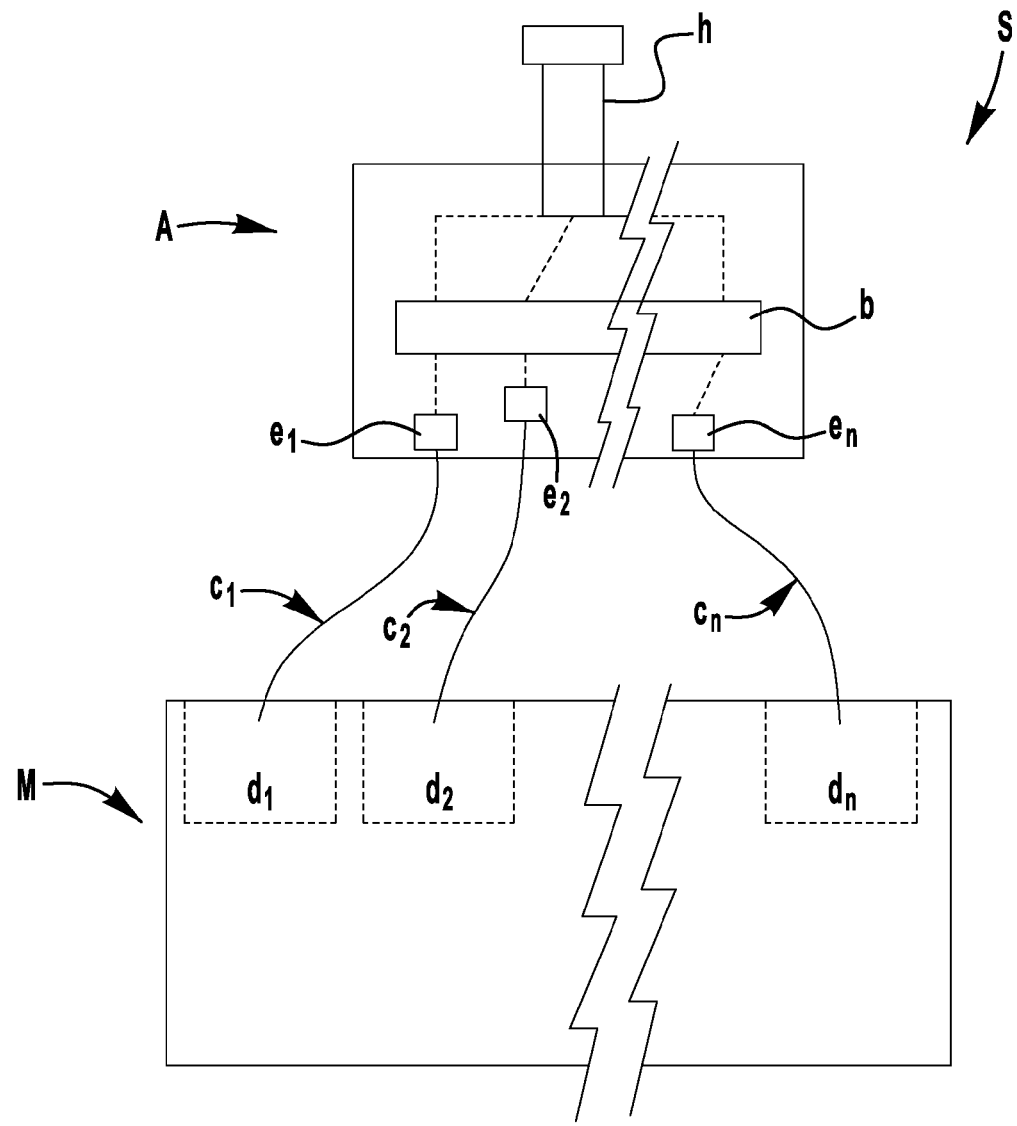
FIG. 1 is a schematic view of a cable actuated assembly in accordance with an exemplary embodiment.

This Description merely describes exemplary embodiments and is not intended to limit the scope of the specification in any way. Indeed, the invention as described is broader than and unlimited by the exemplary embodiments, and the terms used have their full ordinary meaning. For example, while the exemplary embodiments describe actuators and operating systems employing retractable cables, in other embodiments, other types of actuating mechanisms may additionally or alternatively be utilized, including, for example, gear-drive, motor-driven, electrical, pneumatic, and/or hydraulic actuating mechanisms.

As described herein, when one or more components are described as being connected, joined, affixed, coupled, attached, or otherwise interconnected, such interconnection may be direct as between the components or may be indirect, such as through the use of one or more intermediary components. Also as described herein, reference to a "member," "component," or "portion" shall not be limited to a single structural member, component, or element but can include an assembly of components, members or elements.

Cable actuators are often used to provide manual operation of a mechanical or electromechanical device (e.g., a lock or braking system) that is remote from a manual controller, such as a knob, button, lever, or switch. One such actuating cable, known as a Bowden cable, includes an inner cable wire disposed within a fixed lumen or sheath, with the cable wire extending from the controller to the device to operatively connect the controller with the device. Operation of the manual controller applies a pulling force to the cable wire, which is transmitted to the device to operate the device (e.g., by rotating, pivoting, sliding, or otherwise moving a portion of the device). The cable wire is typically spring loaded to return to a normal or default position when the manual controller is returned to a normal position, eliminating the pulling force on the cable wire. Alternatively, a cable actuator may include a cable biased to a force transmitting position in which a pulling force is applied, with a manual controller (e.g., a spring loaded push button) that removes the pulling force from the cable when actuated.

According to one aspect of the present application, an actuator (e.g., a cable actuator) is described for use with apparatuses including multiple actuated systems or devices, or a system or device operated with multiple actuation mechanisms (e.g., actuating cables). In one such application, a cable actuator for an apparatus using first and second actuating cables is arranged such that an actuating force (e.g., a pulling or pushing force) may be applied to only a first cable, in a first selected condition of the actuator, or to only a second cable, in a second selected condition of the actuator. In an exemplary embodiment, a cable actuator is further configured to be operable to a third condition to apply an actuating force to both first and second cables, or to withdraw the actuating force from both of the first and second cables. In other embodiments, more than two cables may be used and any combination of actuating/withdrawing forces may be applied to the cables.

FIG. 1 illustrates a partial schematic view of a cable actuated system S including an assembly M of cable actuated devices $d_1, d_2, \ldots d_n$, operated by a plurality of actuating cables $c_1, c_2, \ldots c_n$ (e.g., Bowden cables). A cable actuator A includes an actuating member b (e.g., a cam, lever, or other such component) that is operatively connected with engageable portions $e_1, e_2, \ldots e_n$ (e.g., end portions) of the cables to selectively actuate one or more of the cables $c_1, c_2, \ldots c_n$ when a manual controller h is moved to a selected position. The selectable positions of the manual controller may be configured to provide for two or more positions of each of the actuating cables (e.g., fully actuated, partially actuated, fully released).

Many different systems or apparatuses may involve actuation of multiple actuation mechanisms to effect operation of the system or apparatus. In an exemplary embodiment of the present application, as partially illustrated in FIG. 2, a standing frame 10 configured to assist handicapped individuals in moving between seated, standing, and supine positions includes a cable actuated operating system 10. In other exemplary embodiments contemplated by the present application, other types of actuating mechanisms or operating systems may be utilized, including, for example, geardrive, motor-driven, electrical, pneumatic, and/or hydraulic actuating mechanisms.

The standing frame 10 includes a seat portion or seat bracket 93 connected with a wheeled base 92 by pivoting sliders 97, 98 for sliding and pivoting articulation of the seat bracket 93 with respect to the base 92 (for example, by operation of a motorized actuation system, not shown) between sitting/supine (substantially horizontal) and standing (substantially vertical) positions. The standing frame 10 further includes a footrest portion or leg carrier bracket 96 pivotable with respect to the base 92 for pivoting movement of the leg carrier bracket to support the lower legs of a user in both sitting (substantially perpendicular to the seat bracket) and supine/standing (substantially collinear with the seat bracket) positions.

To secure the leg carrier bracket 96 with respect to the wheeled base 92 when the seat bracket reaches the standing (substantially vertical) position, the standing frame 10 is provided with a striker latch 46 that automatically latches in this standing position. Many different types of striker latches may be utilized, including, for example, _. The exemplary striker latch is operated by a first cable 40a and is in the locked condition when the first cable is in the extended or returned position, and is unlocked when the first cable is pulled or refracted to the actuated position. When the standing frame 10 is raised from a sitting position to a standing position ("sit-to-stand"), the first cable 40a is released or relaxed to maintain the striker latch 46 is in a locked or automatic latching position. When the standing frame 10 is to be returned to a reclined or supine position, the first cable 40a is pulled or retracted to release the striker latch 46, thereby permitting pivoting movement of the leg carrier bracket 96 with respect to the frame base 92.

To secure the seat bracket in a desired position (e.g., sitting/supine, standing) the sliders 97, 98 are provided with slider locks 47, 48 that secure the sliders against undesired movement when in a locked condition. Many different types of slider locks may be utilized, such as, for example, integral locking slider assemblies (e.g., Mechloks®, manufactured by Crane Aerospace and Electronics). The exemplary slider locks 47, 48 are operated by second and third cables 40b, 40c and are in the locked condition when the second and third cables are in the extended or returned position, and are unlocked when the second and third cables are pulled or retracted to the actuated position. When the standing frame 10 is to be secured in a supine, reclined, or sitting position, the second and third cables 40b, 40c are released or relaxed to maintain the slider locks 47, 48 in a locked position to prevent articulation of the seat bracket 93. When the standing frame 10 is to be operating from a sitting position to a standing position, the second and third cables 40b, 40c are pulled or retracted to release the slider locks 97, 98, thereby permitting sliding and pivoting articulation of the seat bracket 93.

To facilitate operation of a standing frame, the standing frame may be provided with a single actuator that is operable to simultaneously or sequentially operate each of a striker latch, configured to secure and release a leg carrier bracket, and first and second slider locks, configured to secure and release a seat bracket, as described above. The exemplary standing frame 10 includes a cable actuator 11 (which may, but need not, be consistent with the cable actuator 100 of FIGS. 4-8B) operable by manipulation of a pivoting handle 70 between a first "supine" position, a second "sit-to-stand" position, and a third intermediate or "neutral" position. In the supine position, the cable actuator 11 maintains an actuating force on the first cable 40a to maintain the unlocked condition of the striker latch 46, and removes or withholds actuating forces from the second and third cables 40b, 40c to allow the second and third cables to relax or extend to the return position to move the slider locks 47, 48 to the locked condition. In this actuator-selected condition, the seat bracket 93 is secured at a desired angle of inclination.

In the neutral position, the cable actuator 11 applies actuating forces to the second and third cables 40b, 40c to unlock the slider locks, and additionally applies an actuating force to the first cable 40a to pull the first cable to the actuated or refracted position, thereby unlocking the striker latch to permit adjustment of the leg carrier bracket 96. In this actuator-selected condition, the seat bracket 93 and leg carrier bracket 96 are manually adjustable to a desirable orientation.

In the sit-to-stand position, the cable actuator 11 maintains actuating forces on the second and third cables 40b, 40c to pull the cables to the actuated or retracted position, thereby unlocking the slider locks for adjustment of the frame positioning sliders 97, 98. The first cable remains in a relaxed, extended position to maintain the striker latch in the locked or automatic latching condition for securely fixing the leg carrier bracket 96 of the frame when the standing frame 10 has been raised to the standing position.

Figure 3A:
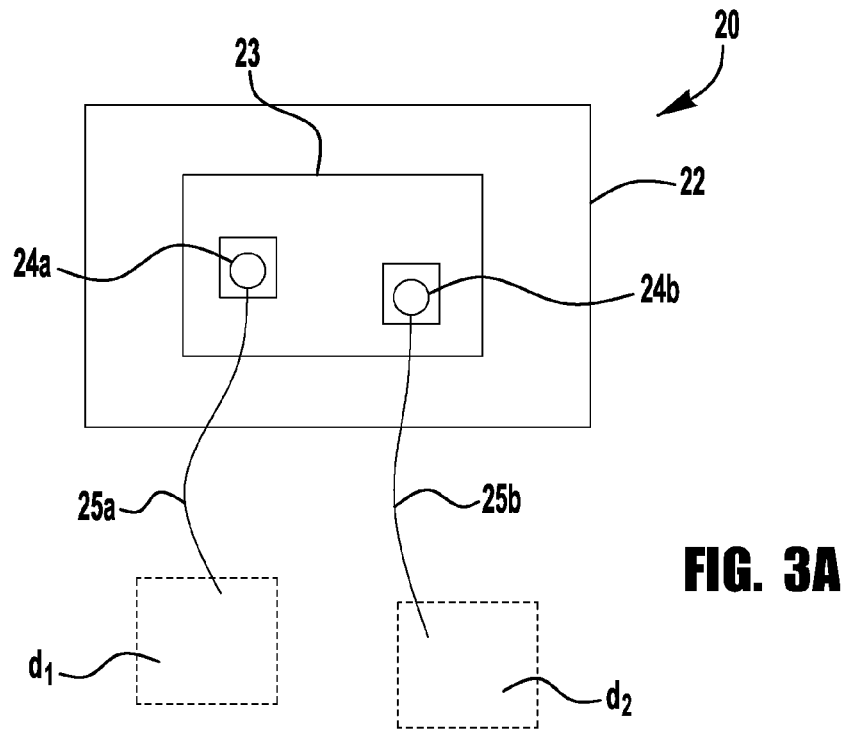
FIG. 3A is a schematic view of an exemplary cable actuator shown in a first condition.
Figure 3B:
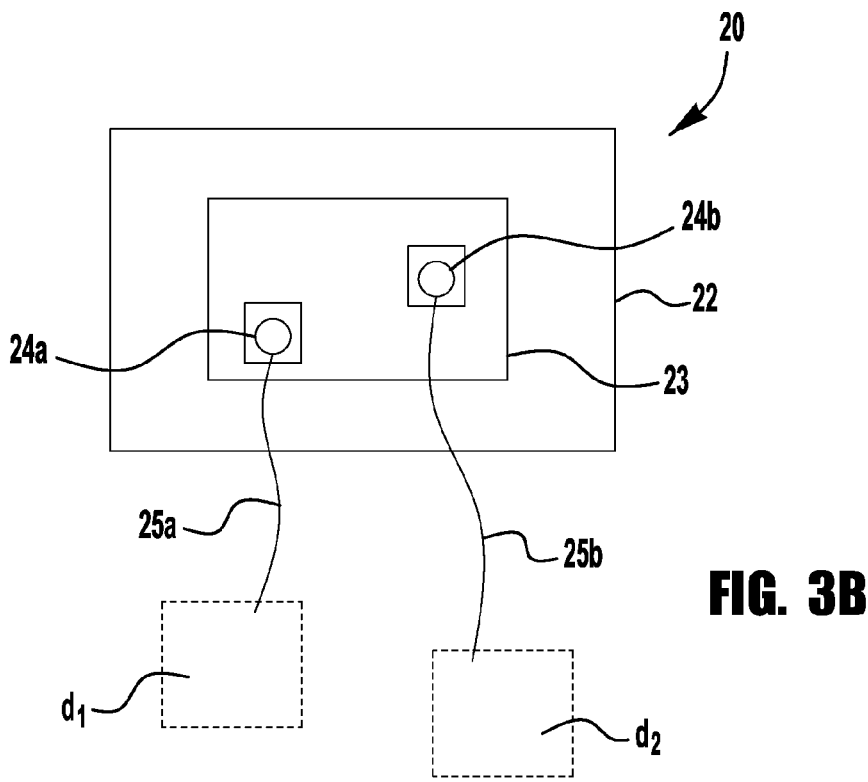
FIG. 3B is a schematic view of the cable actuator of FIG. 2B, shown in a second condition.
Figure 4:
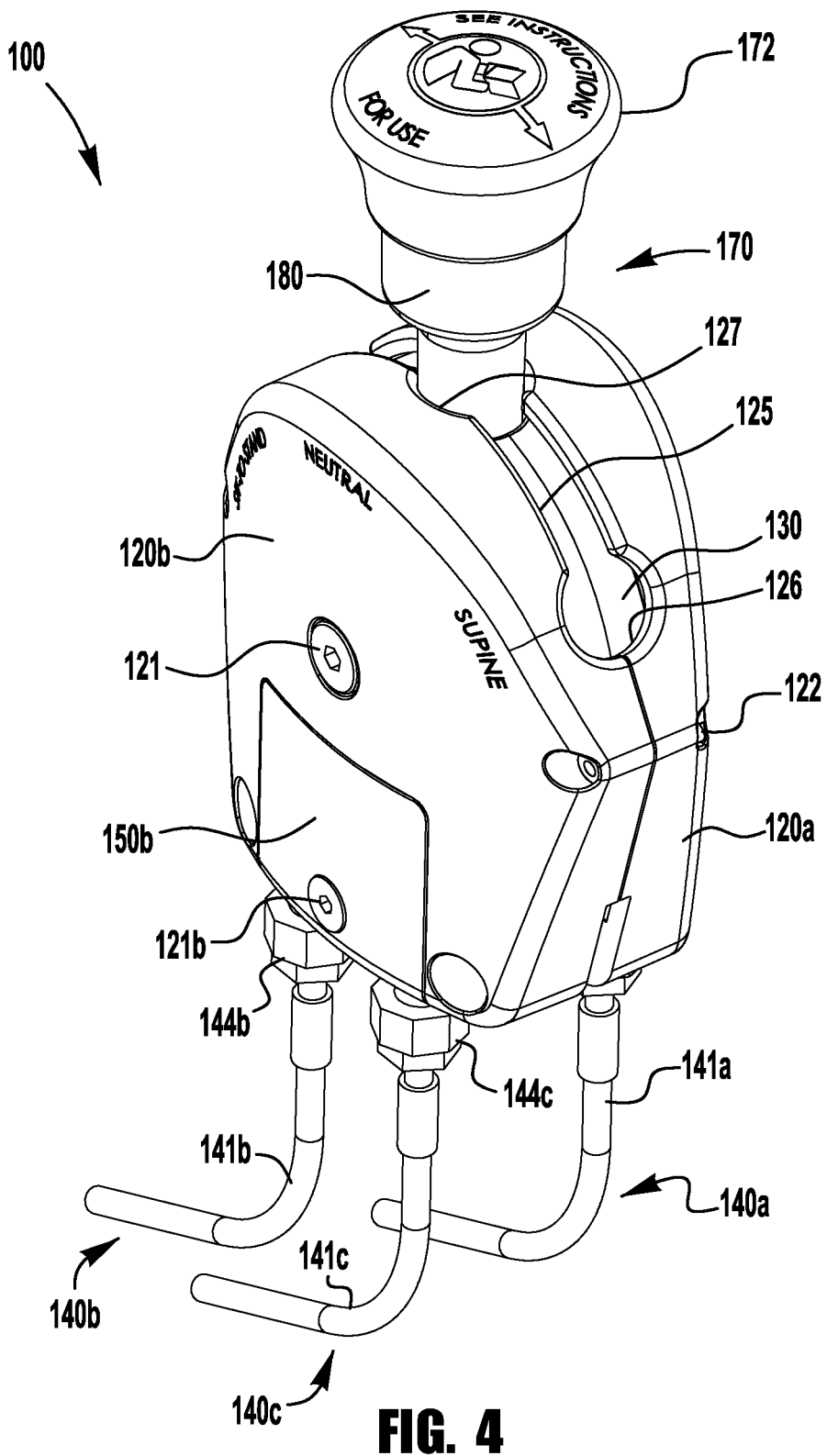
FIG. 4 is a perspective view of a cable actuator in accordance with an exemplary embodiment.

Many different types of cable actuators may be utilized. In one embodiment, shown schematically in FIGS. 3A and 3B, a cable actuator 20 includes a housing 22 enclosing a cam 23 operatively connected with first ends 24a, 24b of first and second reciprocally movable cables 25a, 25b for engagement with first and second devices $d_1$, $d_2$ to be actuated. The cam is movable to selectively operate either one of the first and second cables 25a, 25b. The cam 23 is movable to at least two positions: a first position (FIG. 3A) in which an actuating force is only applied to the first cable 25a, and a second position (FIG. 3B) in which an actuating force is only applied to the second cable 25b.

While any suitable operative connection between a cam and the first and second cables may be utilized, in one embodiment, the cam includes first and second tracks receiving projections secured to the ends of the corresponding cables. The tracks may be contoured or otherwise oriented to translate movement of the cam (e.g., rotating, pivoting, or sliding movement) to reciprocating movement (e.g., pulling, pushing, or releasing) of the cables. Movement of the cam causes the first and second tracks to guide the projections for movement of the first and second cables between actuated and return positions. In embodiments with more than two cables, more than two tracks may be used. Furthermore, a single track may operate on multiple cables.

To provide for different, non-synchronized movement of the first and second cables, the first and second tracks may be differently contoured or oriented. In one such example, the first and second tracks are oriented such that when the cam is moved to a first position, the first track guides a first projection connected with the first cable to move the first cable to the actuated position, and the second track guides a second projection connected with the second cable to move the second cable to the return position. When the cam is moved to a second position, the first track guides the first projection to move the first cable to the return position, and the second track guides the second projection to move the second cable to the actuated position. In other embodiments, the number of cables (e.g., 3, 4, or more cables), tracks (e.g., 3, 4, or more tracks), cam positions (e.g., 3, 4, or more cam positions) may be varied, for example, to operate more than two actuating cables, to provide multiple combinations of cable positions (e.g., multiple cables actuated or multiple cables released), or to actuate one or more of the cables to one or more intermediary positions (i.e., between fully actuated and return positions).

Figure 2:
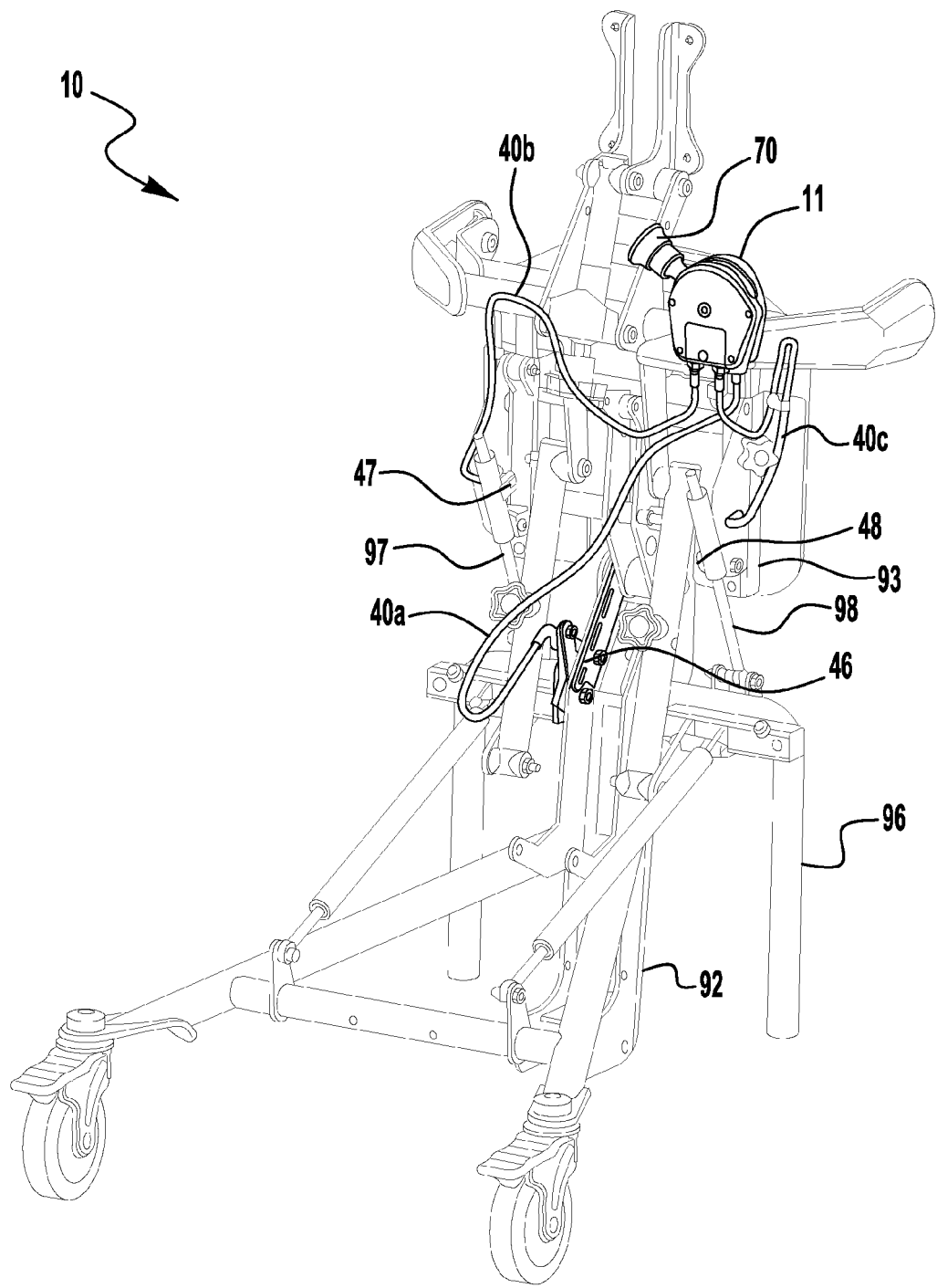
FIG. 2 is a perspective view of a portion of a standing frame including an operating system having a cable actuator in accordance with an exemplary embodiment, with portions of the system shown in phantom to emphasize other portions of the system.
Figure 9A:
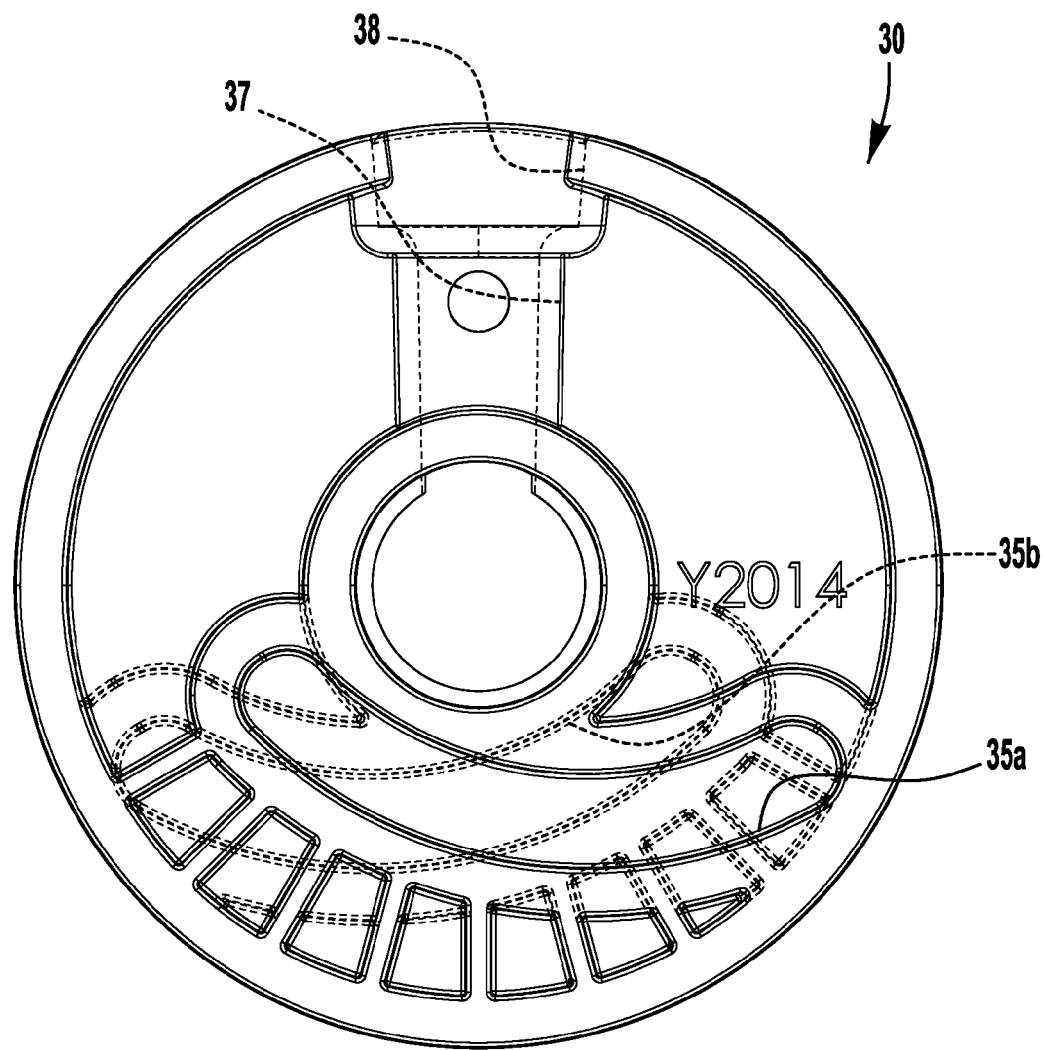
FIG. 9A is a front view of the cam wheel of the cable actuator of FIG. 4, shown in phantom to illustrate the orientations of both tracks.
Figure 9B:
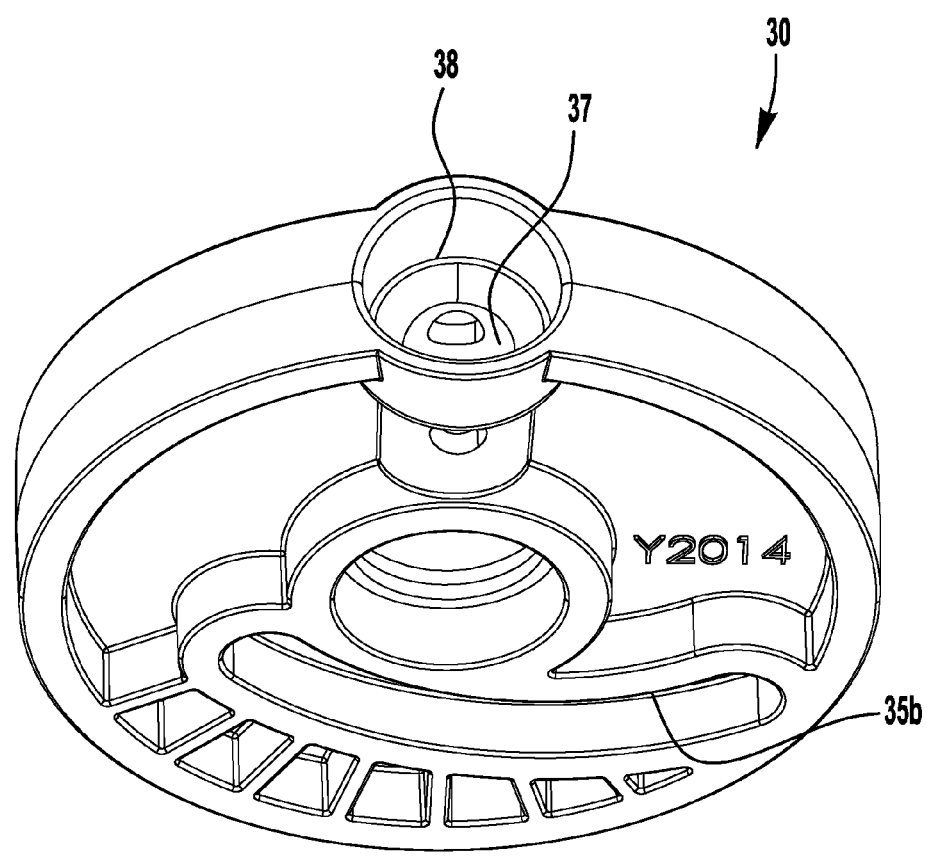
FIG. 9B is an upper rear perspective view of the cam wheel of the cable actuator of FIG. 4.
Figure 10:
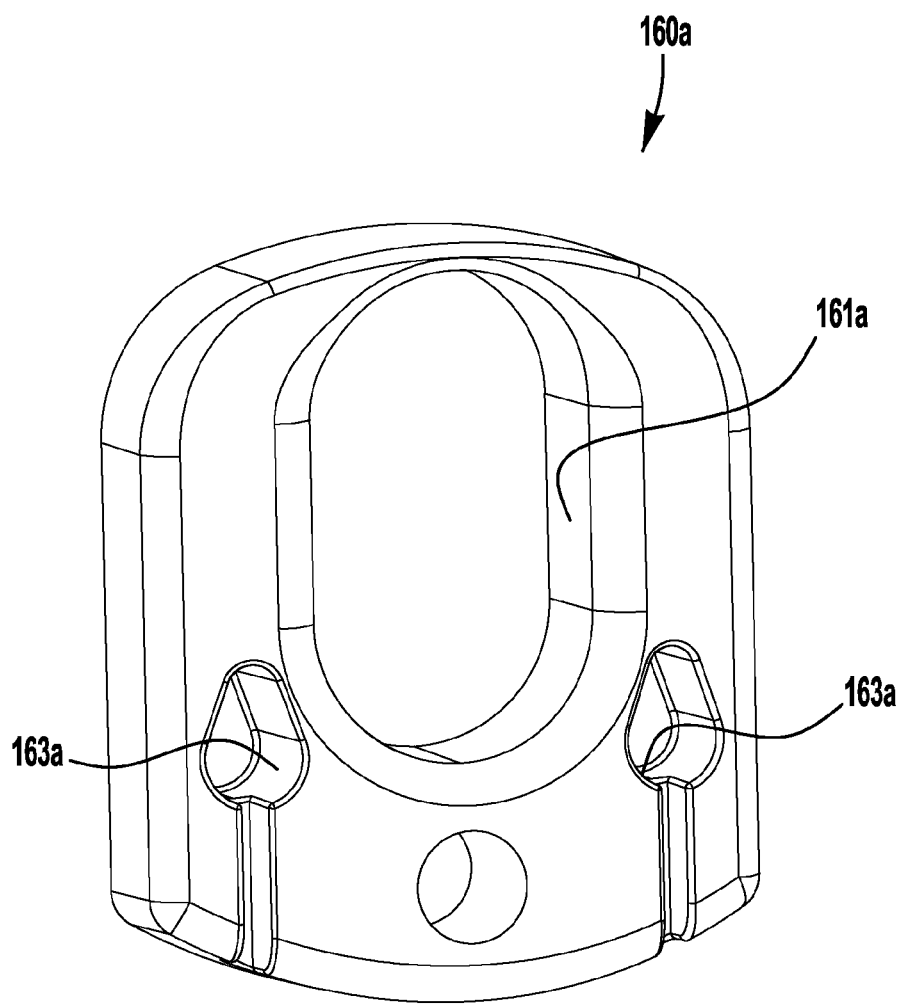
FIG. 10 is a front view of a slide member of the cable actuator of FIG. 4.

FIGS. 4-8B illustrate an exemplary embodiment of a cable actuator 100, for use, for example, with the operating system 10 of FIG. 2, or with any suitable system or device utilizing multiple actuating cables. The cable actuator 100 includes a housing 120 formed from opposed housing members 120a, 120b secured together by fasteners 121, 122, an operating cam 130 disposed within the housing, and first, second, and third cable assemblies 140a, 140b, 140c assembled with the housing 120. The cam 130, more clearly shown in FIGS. 9A and 9B, is rotatably mounted within the housing 120 on bushings 133a, 133b installed on the fastener 121. The cable assemblies each include a hollow outer sheath 141a, 141b, 141c and an inner cable wire 142a, 142b, 142c axially movable within the sheath. The sheaths are secured to the housing 120 by cable mount covers 150a, 150b fastened to the housing (e.g., by fasteners 151a, 151b). The cable wires include first ends 143a, 143b, 143c disposed within the housing 120 for connection with the cam 130, and second ends (not shown) for connection with one or more cable actuated devices or systems. The cables may be spring-loaded or otherwise in tension, such that in the absence of an actuating force applied by the cable actuator, the cables are biased to a return position opposite the actuated position. As shown, the sheaths may be provided with ferrules 144a, 144b, 144c that are adjustable to apply an adjustable clamping force on the cable wires, thereby varying the resistance to axial movement of each cable wire.

While the ends of the cable wires may be connected directly with the operating cam, in the illustrated embodiment, the cable ends are secured to cable end retaining portions of actuator slide members 160a, 160b disposed between the cam 130 and the sides of the housing 120. The exemplary cable ends include cylindrical nipples that are retained in complementary shaped cavities 163a, 163b in the slide members. The slide members 160a, 160b include elongated openings 161a, 161b in which the bushings 133a, 133b are disposed, allowing for radial movement of the slide members with respect to the cam 130 (i.e., towards or away from the central axis of the cam). As shown, the slide members 160a, 160b may be provided with multiple cavities 163a, 163b (or other such attachment features) for actuation of multiple cables by a single slide member.

To selectively position the slide members 160a, 160b with respect to the cam, the cam 130 includes a contoured track 135a, 135b on each side engaging a pin or other such projection 165a, 165b secured to the corresponding slide member 160a, 160b. In the illustrated embodiment, the tracks are formed as recessed grooves in the sides of the cam. In other embodiment, the tracks may be formed from other structures, such as ridges, channels, or slots. The tracks 135a, 135b are contoured to vary the distance from the cam axis, such that rotation of the cam 130 causes the projections 165a, 165b to be guided by the tracks to varying radial positions with respect to the cam axis. These varying radial positions translate into actuating and return forces on the cables. In the illustrated embodiment, when the projection is disposed in a radially inward portion of the track, the slide member and cable end are moved to a pulled or retracted position. When the projection is disposed in a radially outward portion of the track, the slide member and cable end are moved to a pushed or extended position. As shown, the tracks 135a, 135b may be gradually contoured to facilitate smooth operation of the cam.

While the contoured tracks of an actuating cam may be aligned to provide simultaneous, synchronized movement of the slide members and cable ends, in other embodiments, the tracks may be contoured differently, such that movement of the cam produces different actuation of each of the slide members and cables. In the illustrated embodiment, the first and second tracks 135a, 135b are oppositely contoured (see FIG. 9), such that in a first rotational orientation of the cam 130 (FIGS. 6A and 6B), the first slide member 160a is guided to the actuated position for its associated cable and the second slide member 160b is guided to the return position for its associated cables, and in a second rotational orientation of the cam 130 (FIGS. 7A and 7B), the first slide member 160a is guided to the return position for its associated cable and the second slide member 160b is guided to the actuated position for its associated cables. Additionally, the tracks may be further contoured such that in an intermediate rotational orientation of the cam 130 (FIGS. 8A and 8B), between the first and second rotational orientations, both slide members and their associated cables are guided to the actuated position.

Figure 6A:
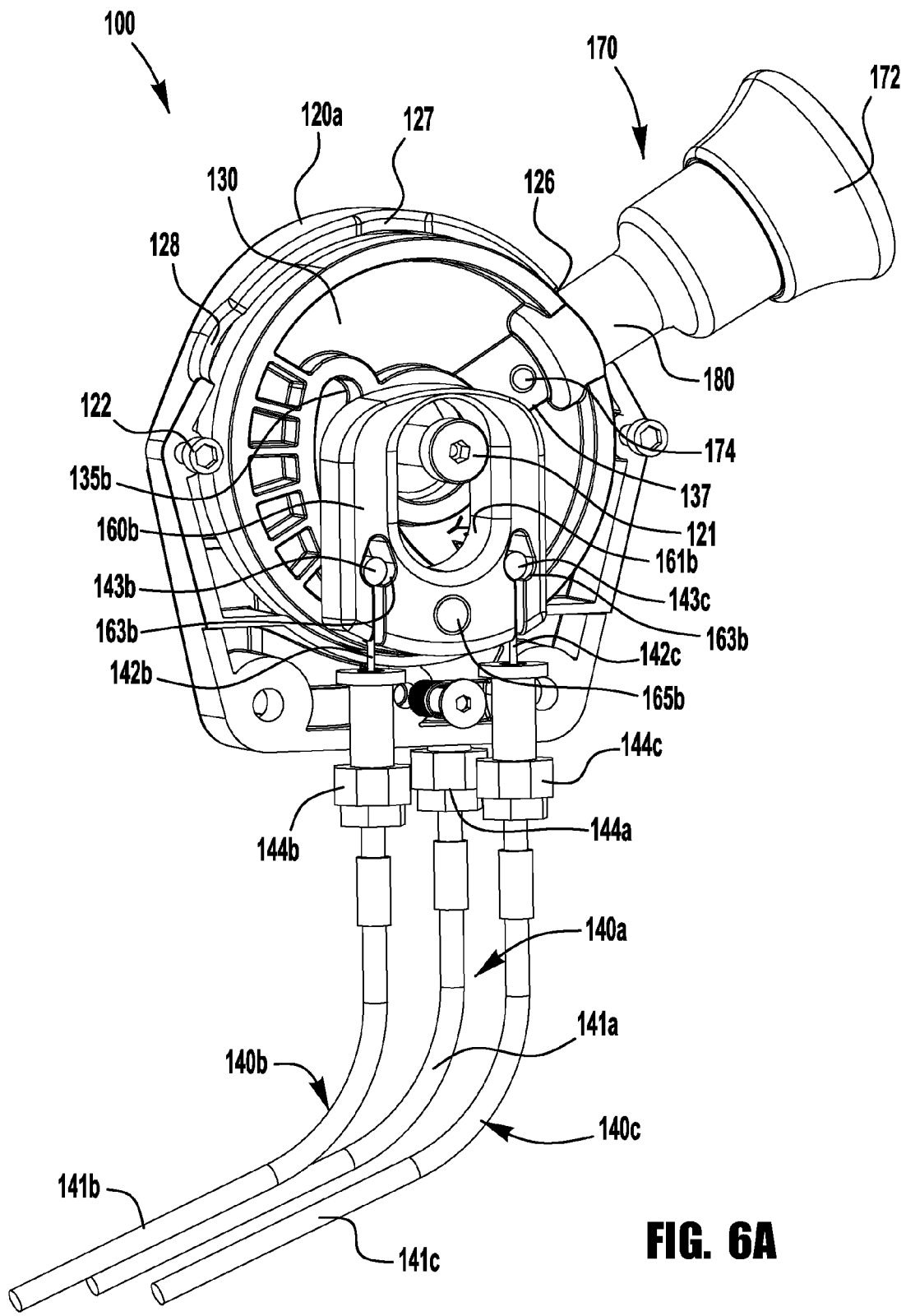
FIG. 6A is a front view of the cable actuator of FIG. 4 shown in a first position, with a portion of the housing removed to illustrate additional features of the cable actuator.
Figure 6B:
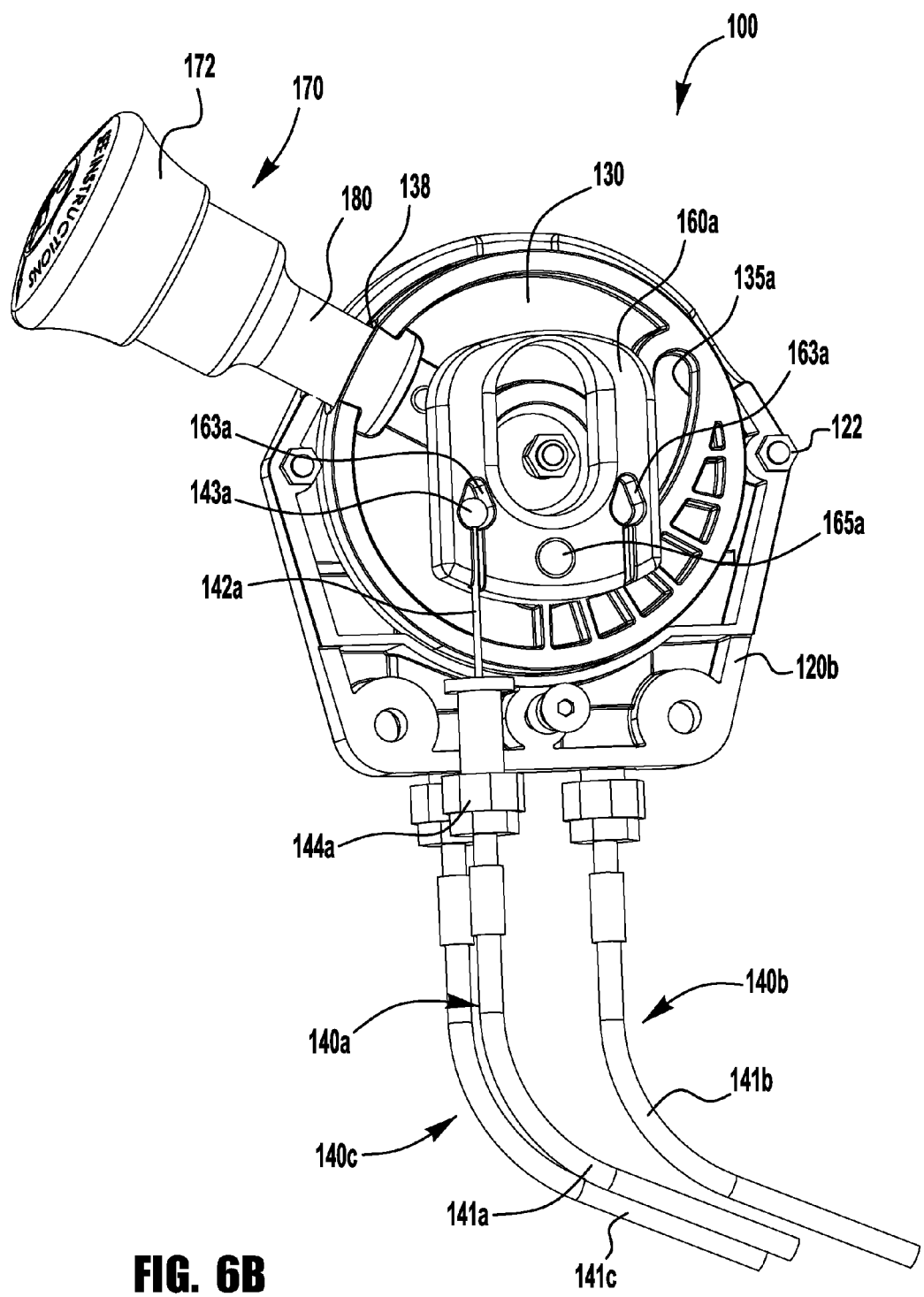
FIG. 6B is a rear view of the cable actuator of FIG. 4 shown in the first position, with a portion of the housing removed to illustrate additional features of the cable actuator.
Figure 7A:
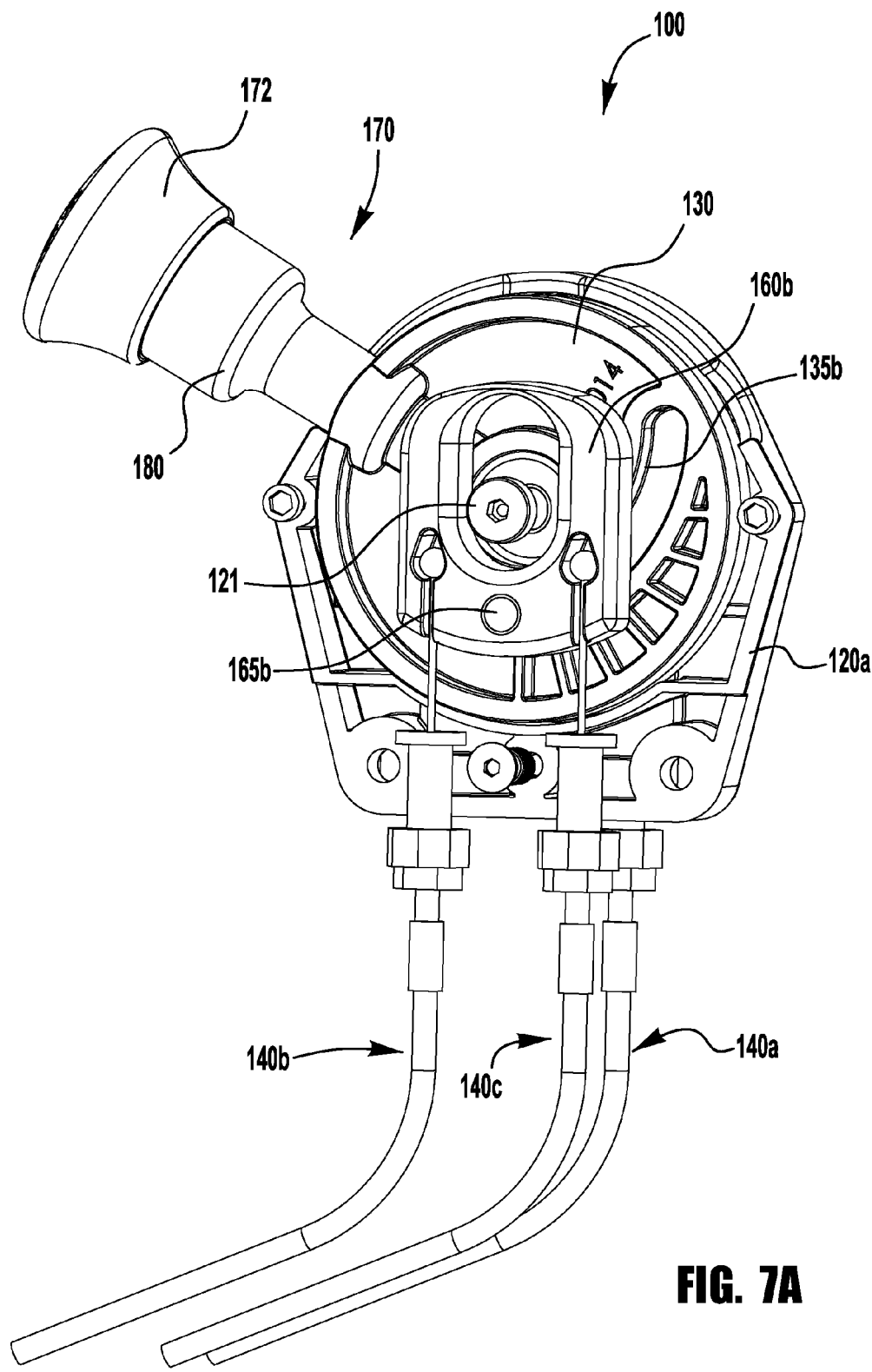
FIG. 7A is a front view of the cable actuator of FIG. 4 shown in a second position, with a portion of the housing removed to illustrate additional features of the cable actuator.
Figure 7B:
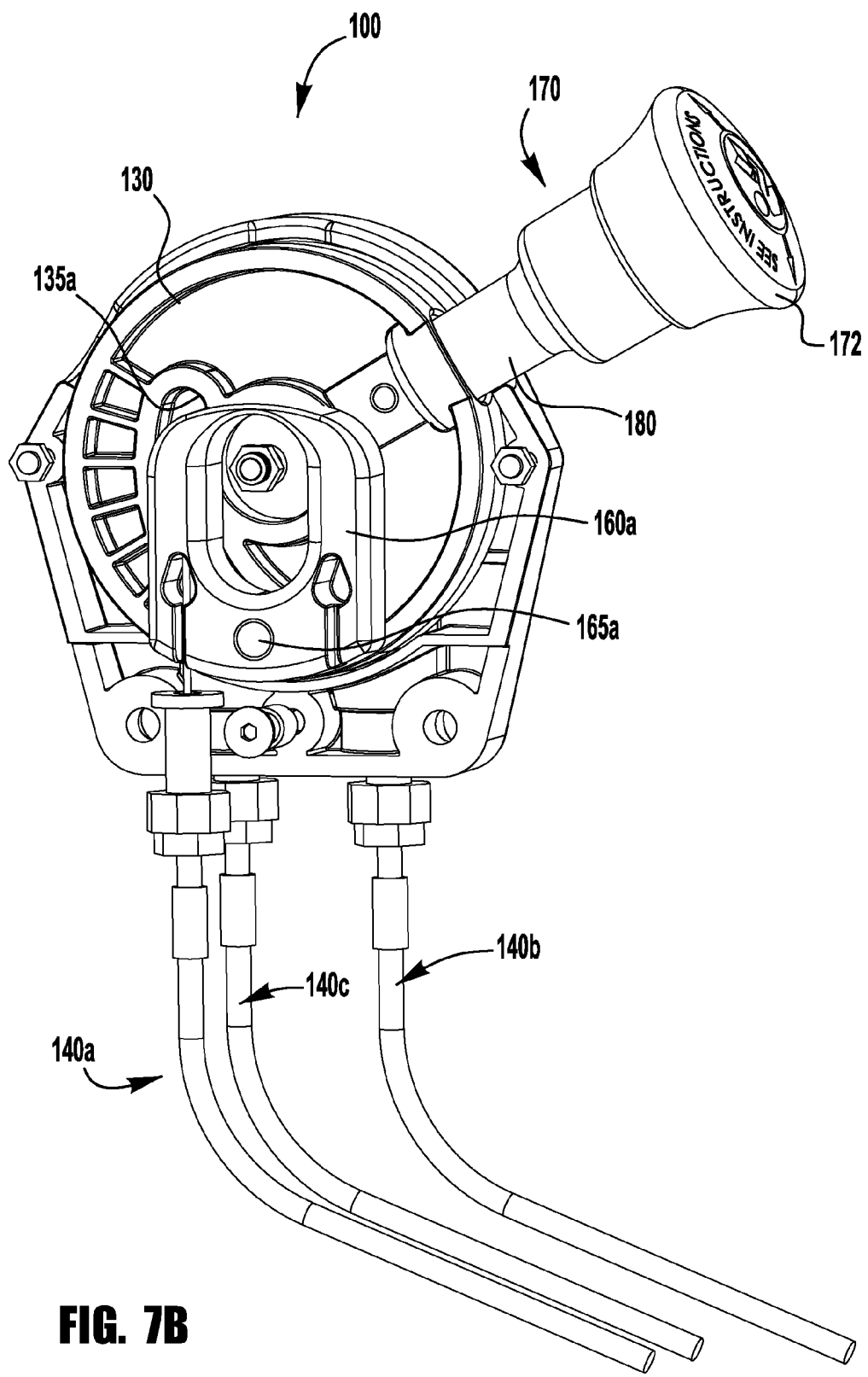
FIG. 7B is a rear view of the cable actuator of FIG. 4 shown in the second position, with a portion of the housing removed to illustrate additional features of the cable actuator.
Figure 8A:
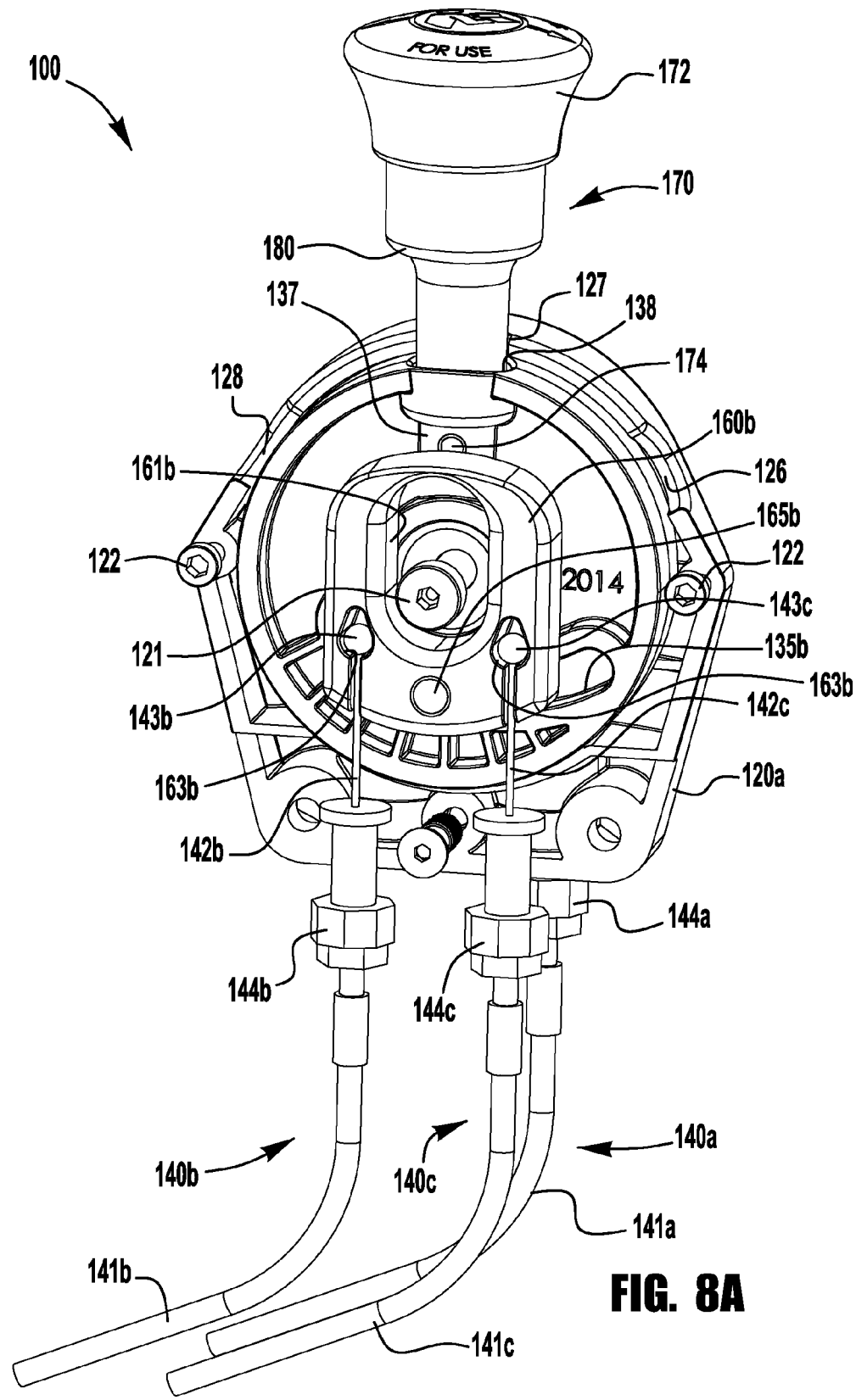
FIG. 8A is a front view of the cable actuator of FIG. 4 shown in a third position, with a portion of the housing removed to illustrate additional features of the cable actuator.
Figure 8B:
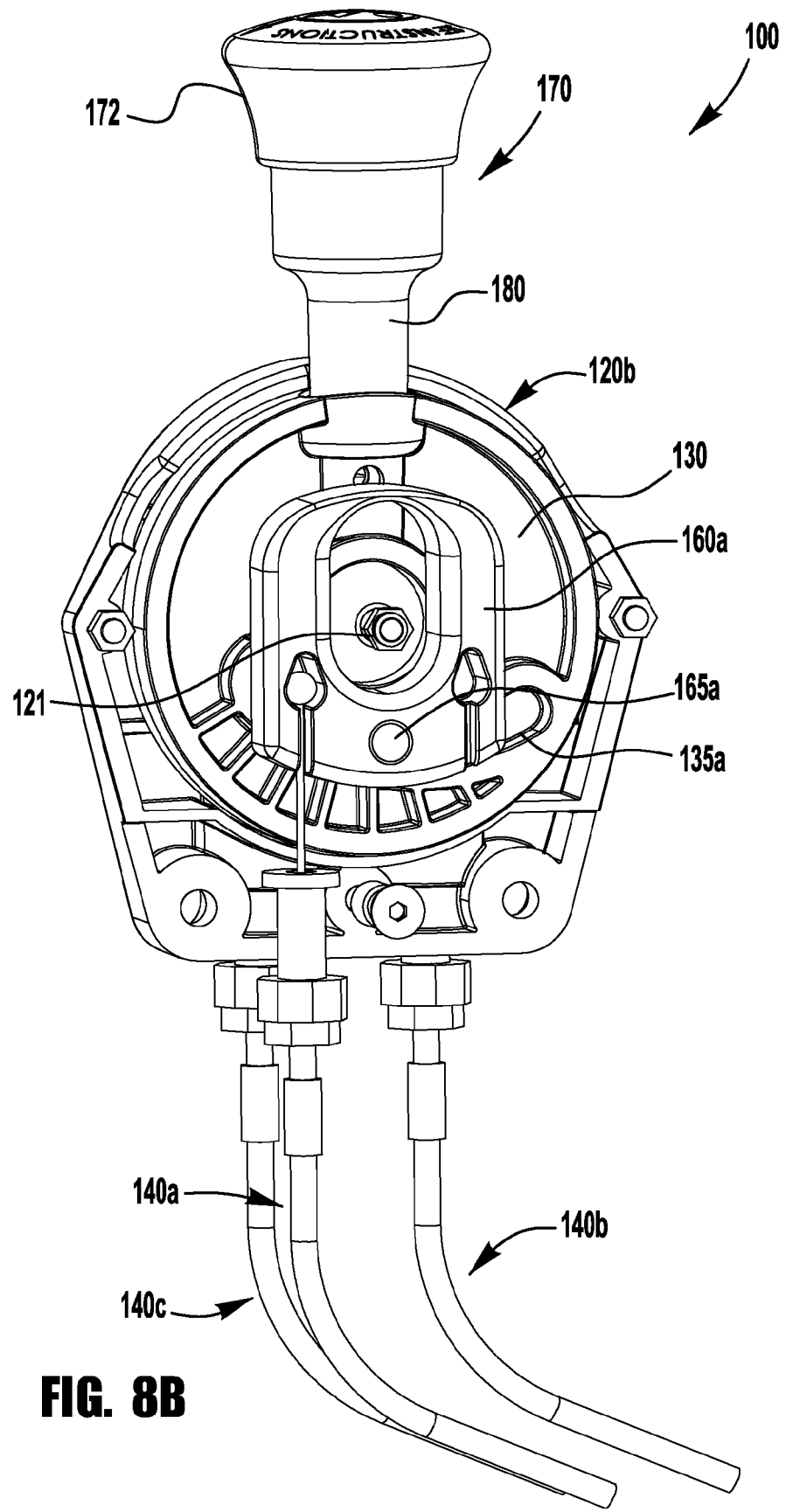
FIG. 8B is a rear view of the cable actuator of FIG. 4 shown in the third position, with a portion of the housing removed to illustrate additional features of the cable actuator.

In an exemplary embodiment, when used with a standing frame apparatus (e.g., a standing frame apparatus including the operating system 10 of FIG. 2), the first position of FIGS. 6A and 6B corresponds to a "supine" position in which the first cable 140a is actuated to unlock a striker latch 46, and the second and third cables 140b, 140c are returned or released to secure opposed slider locks 47, 48. The second position of FIGS. 7A and 7B corresponds to a "sit-to-stand" position in which the first cable 140a is returned or released to secure the striker latch 46, and the second and third cables 140b, 140c are actuated to unlock the slider locks 47, 48. The third position of FIGS. 8A and 8B corresponds to a "neutral" position in with all three cables 140a, 140b, 140c are actuated to unlock both the striker latch 46 and the slider locks 47, 48.

Many different manual controllers may be utilized to operate a cable actuating cam described above, including, for example, a lever, knob, or push button. In the illustrated embodiment, a lever handle 170 is secured within a radially extending bore 137 in the cam 130 (for example, by a roll pin 174), with a handle shaft 171 extending through a slot 125 in the housing 120, and a user graspable handle knob 172 secured to the end of the shaft 171. The cam is selectively positioned by pivotal movement of the handle 170 within the slot 125, with the handle 170 aligned with a first end of the slot 125 in a first rotational orientation (for example, for actuation of the first slide member and return of the second slide member) and with a second end of the slot 125 in a second rotational orientation (for example, for actuation of the second slide member and return of the first slide member). The selectable positions of the handle may be identified, for example, by markings or other indicia on the handle, cable actuator housing, or some other portion of the cable actuated apparatus.

To secure the handle 170 and cam 130 in a selected orientation, the cable actuator may be provided with one or more detents, stops, or lockout features. While many different handle securing arrangements may be used, in one embodiment, a releasable lockout member is assembled with the handle 170 to releasably retain the handle 170 in at least one of a plurality of selectable positions. In the illustrated embodiment, a lockout member is provided as a collar 180 that surrounds the handle shaft 171 and is received in an enlarged outer portion 138 of the cam bore 137. In each of the cam's selectable orientations, the collar 180 is receivable in an enlarged opening 126, 127, 128 in the housing 120 to securely position the handle 170 and cam 130 in the selected orientation. The collar 180 may be spring biased toward this secure or lockout position (for example, by spring 189) or may be otherwise movable into the lockout position. To move the handle to a different selected position, the collar 180 may be lifted to withdraw the collar from the opening, such that the collar does not obstruct movement of the cam 130 with respect to the housing 120. When the cam 130 is moved to the new selected position, the collar 180 may be released and spring biased (or otherwise moved) into the corresponding housing opening for retention of the cam 130 in the new position.

Other features or modifications may be applied to the inventive cable actuators described herein. For example, while the exemplary embodiments described herein utilize actuating cables that are pulled to actuate the controlled devices, in other embodiments, one or more of the actuating cables may be pushed to actuate the controlled devices, and may (but need not) be biased toward the retracted (i.e., toward the cable actuator) position. As another example, while the described embodiments utilize a cam having a guiding track on each side, in other embodiments, multiple guiding tracks may be provided on one or both sides of the cam, such that more than two different or non-synchronous cable operations may be controlled by a single cam. In still other embodiments, a cable actuator may utilize multiple cam wheels, which may (but need not) be operatively connected for co-rotation, allowing for actuation of several cables or sets of cables by operation of a single manual controller.

In other embodiments, the shape or contour of the guiding tracks on an actuating cam may be selected for a desired rate or distance of cable actuation. For example, a shallow angled track may provide for more gradual cable actuation and/or a shorter distance of cable actuation, while a steep angled track may provide for more rapid cable actuation and/or a greater distance of cable actuation. Further, non-angled portions of track may provide for a predetermined amount of cam dwell prior to actuation of one or more of the cables. For example, a first track, guiding cable actuation of a first device, may be contoured for an extended cam dwell, as compared to the contour of a second track, guiding cable actuation of a second device. As a result, when the manual controller is moved from a first position to a second position, the first device is actuated after actuation of the second device.

Still further, a manual controller may be configured for a desired number of operating positions corresponding to a desired number of combinations of cable positions, including actuated, return, and partially actuated positions of one or more of the actuating cables, or a combination of actuated, return, and partially actuated positions of the multiple cables. These positions may be identified by markings or other indicia on the handle, on the cable actuator housing, and/or on some other portion of the apparatus. Detent, stop, or lockout features may, but need not, be provided for one or more of the multiple positions. Markings on the handle, cable actuator housing, or apparatus may additionally include instructions for proper operation of the cable actuator, including, for example, release of the handle from a lockout or detent position.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

I claim:

1. A cable actuator comprising:
   a housing;
   a cam disposed in the housing and rotatable about a fastener assembly defining a cam axis between a first position;
   a first slide member retained within the housing and including a first cavity for retaining an end portion of a first cable when the first cable is assembled with the cable actuator, and a first projection spaced apart from the first cavity; and
   a second slide member retained within the housing and including a second cavity for retaining an end portion of a second cable when the second cable is assembled with the cable actuator, and a second projection spaced apart from the second cavity;
   wherein the cam comprises a first track receiving the first projection and a second track receiving the second projection, wherein the first track is contoured to move the first slide member from a return position to an actuated position when the cam is moved to the first position, and the second track is contoured to move the second slide member from a return position to an actuated position when the cam is moved to the second position;
   wherein each of the first and second slide members includes an elongated opening receiving the fastener assembly to permit radial sliding movement of the first and second slide members with respect to the cam.

2. The cable actuator of claim 1, wherein the cam is movable to a third position in which the first and second cable retaining portions are both in the actuated positions.

3. The cable actuator of claim 1, wherein the cam is moveable to a third position in which the first and second cable retaining portions are both in the return position.

4. The cable actuator of claim 1, wherein the first slide member further includes a third cavity for retaining an end portion of a third cable when the third cable is assembled with the cable actuator.

5. The cable actuator of claim 1, wherein the first track is disposed on a first side of the cam and the second track is disposed on a second side of the cam opposite the first side.

6. The cable actuator of claim 5, wherein the first slide member is disposed between the first side of the cam and a first side of the housing, and the second slide member is disposed between the second side of the cam and a second side of the housing.

7. The cable actuator of claim 1, further comprising a manual controller connected with the cam and extending outward of the housing for manual operation of the cam.

8. The cable actuator of claim 7, wherein the manual controller comprises a pivotable handle movable within a slot in the housing for movement of the cam between the first and second positions.

9. The cable actuator of claim 8, further comprising a lockout member assembled with the handle and movable on the handle between a lockout position obstructing movement of the handle within the slot and an operating position permitting movement of the handle within the slot.

10. The cable actuator of claim 9, wherein the lockout member comprises a spring-biased collar surrounding the handle, the collar being receivable in a complementary shaped recess in the lockout position when the cam is in at least one of the first and second positions.

11. A cable actuating system comprising:
    the cable actuator of claim 1;
    a first cable having a first end portion positioned within the housing and retained by the first cavity of the first slide member and a second end extending from the housing; and
    a second cable having a first end portion positioned within the housing and retained by the second cavity of the second slide member and a second end extending from the housing.

12. The cable actuating system of claim 11, wherein the first and second cables comprise Bowden cables.

13. A cable actuated apparatus comprising:
    the cable actuator of claim 1;
    a first cable having a first end portion positioned within the housing and retained by the first cavity of the first slide member and a second end extending from the housing;
    a first device connected with the second end of the first cable and operable between a first condition and a second condition in response to movement of the first cable retaining portion between the actuated position and the return position;
    a second cable having a first end portion positioned within the housing and retained by the second cavity of the second slide member and a second end extending from the housing; and
    a second device connected with the second end of the first cable and operable between a first condition and a second condition in response to movement of the second cable retaining portion between the actuated position and the return position.

14. The apparatus of claim 13, wherein at least one of the first and second devices comprises a lock movable from a locked condition to an unlocked condition when the at least one of the first and second devices is moved to the actuated condition.

15. The apparatus of claim 13, wherein at least one of the first and second devices comprises a latch movable from an automatic latching condition to a released condition when the at least one of the first and second devices is moved to the actuated condition.

16. A cable actuator comprising:
a housing;
a cam disposed in the housing and rotatable about a fastener assembly defining a cam axis between a first position;
a first slide member retained within the housing and including a first cavity for retaining an end portion of a first cable when the first cable is assembled with the cable actuator, and a first projection spaced apart from the first cavity; and
a second slide member retained within the housing and including a second cavity for retaining an end portion of a second cable when the second cable is assembled with the cable actuator, and a second projection spaced apart from the second cavity;
wherein the cam comprises a first track receiving the first projection and a second track receiving the second projection, wherein the first track is contoured to move the first slide member from a return position to an actuated position when the cam is moved to the first position, and the second track is contoured to move the second slide member from a return position to an actuated position when the cam is moved to the second position; and
wherein the first slide member further includes a third cavity for retaining an end portion of a third cable when the third cable is assembled with the cable actuator.

17. The cable actuator of claim 16, wherein the cam is movable to a third position in which the first and second cable retaining portions are both in the actuated positions.

18. The cable actuator of claim 16, wherein the cam is moveable to a third position in which the first and second cable retaining portions are both in the return position.

19. The cable actuator of claim 16, wherein the first track is disposed on a first side of the cam and the second track is disposed on a second side of the cam opposite the first side.

20. The cable actuator of claim 19, wherein the first slide member is disposed between the first side of the cam and a first side of the housing, and the second slide member is disposed between the second side of the cam and a second side of the housing.

21. The cable actuator of claim 16, further comprising a manual controller connected with the cam and extending outward of the housing for manual operation of the cam.

22. The cable actuator of claim 21, wherein the manual controller comprises a pivotable handle movable within a slot in the housing for movement of the cam between the first and second positions.

23. A cable actuating system comprising:
the cable actuator of claim 16;
a first cable having a first end portion positioned within the housing and retained by the first cavity of the first slide member and a second end extending from the housing; and
a second cable having a first end portion positioned within the housing and retained by the second cavity of the second slide member and a second end extending from the housing.

* * * * *